United States Patent
Warnick et al.

(10) Patent No.: US 10,581,893 B2
(45) Date of Patent: Mar. 3, 2020

(54) MODELING OF ATTACKS ON CYBER-PHYSICAL SYSTEMS

(71) Applicants: BRIGHAM YOUNG UNIVERSITY, Provo, UT (US); Washington State University, Pullman, WA (US)

(72) Inventors: Sean Warnick, Provo, UT (US); Sandip Roy, Pullman, WA (US)

(73) Assignees: Brigham Young University (BYU), Provo, UT (US); Washington State University, Pullman, WA (US)

( * ) Notice: Subject to any disclaimer, the term of this patent is extended or adjusted under 35 U.S.C. 154(b) by 154 days.

(21) Appl. No.: 15/833,693

(22) Filed: Dec. 6, 2017

(65) Prior Publication Data

US 2018/0159890 A1    Jun. 7, 2018

Related U.S. Application Data

(60) Provisional application No. 62/451,366, filed on Jan. 27, 2017, provisional application No. 62/430,522, filed on Dec. 6, 2016.

(51) Int. Cl.
*H04L 29/06* (2006.01)
*G06F 7/08* (2006.01)

(52) U.S. Cl.
CPC .......... *H04L 63/1433* (2013.01); *G06F 7/08* (2013.01); *H04L 63/1466* (2013.01)

(58) Field of Classification Search
CPC .... H04L 63/1433; H04L 63/1466; G06F 7/08
See application file for complete search history.

(56) References Cited

U.S. PATENT DOCUMENTS

| 8,407,798 B1 * | 3/2013 | Lotem ..................... G06F 21/55 726/18 |
| 2003/0217039 A1 * | 11/2003 | Kurtz .................. G02B 5/3083 |

(Continued)

OTHER PUBLICATIONS

V. Chetty et al.: "Vulnerability Analysis for Distributed and Coordinated Destablization Attacks," 53rd IEEE Conference on Decision and Control, Los Angeles, CA, Dec. 15-17, 2014, pp. 511-516.

(Continued)

*Primary Examiner* — Ghodrat Jamshidi
(74) *Attorney, Agent, or Firm* — Brake Hughes Bellermann LLP (57) ABSTRACT

Techniques of preventing sabotage attacks in cyber-physical systems involve automatically identifying links between nodes of a graph representing cyber-physical systems as vulnerable to sabotage attacks according to a vulnerability metric for each link. The vulnerability metric used depends on the particular sabotage attack used to determine the vulnerable links. Once a computer configured to design cyber-physical systems based on vulnerability to sabotage attacks receives data representing the graph, the computer enumerates the possible links between nodes of the graph along which a sabotage attack may be performed. For each of those links, the computer computes the vulnerability metric. The computer then ranks the links according to respective values of the vulnerability metric. Based on the ranking, a designer may then perform a mitigation analysis that results in changes to the graph to reduce the vulnerability at each node accessible to a malicious actor.

21 Claims, 5 Drawing Sheets

(56) References Cited

U.S. PATENT DOCUMENTS

| | | | |
|---|---|---|---|
| 2004/0015728 A1* | 1/2004 | Cole | G02B 5/3083 |
| | | | 726/23 |
| 2004/0078384 A1* | 4/2004 | Keir | G02B 5/3083 |
| 2005/0177746 A1* | 8/2005 | Bunn | H04L 63/102 |
| | | | 726/5 |
| 2005/0260973 A1* | 11/2005 | van de Groenendaal | |
| | | | H04L 63/102 |
| | | | 455/411 |
| 2007/0011319 A1* | 1/2007 | McClure | G02B 6/105 |
| | | | 709/224 |
| 2010/0293616 A1* | 11/2010 | Young | G06F 21/564 |
| | | | 726/25 |
| 2013/0276126 A1* | 10/2013 | Zhou | G06F 21/577 |
| | | | 726/25 |
| 2014/0173742 A1* | 6/2014 | Gluck | G06F 21/577 |
| | | | 726/25 |
| 2017/0331849 A1* | 11/2017 | Yu | H04L 63/1433 |
| 2018/0013777 A1* | 1/2018 | DiValentin | G06Q 10/0635 |
| 2018/0069865 A1* | 3/2018 | Rieke | H04L 63/0209 |
| 2018/0139104 A1* | 5/2018 | Seddigh | H04L 41/12 |

OTHER PUBLICATIONS

A. Cox et al.: "A Science of System Security," 53rd IEEE Conference on Decision and Control, Los Angeles, CA, Dec. 15-17, 2014, pp. 487-492.

D. Grimsman et al. "A Case Study of a Systematic Attack Design Method for Critical Infrastructure Cyber-Physical Systems," American Control Conference (ACC), Jul. 6-8, 2016, 6 pages.

A. Rai et al.: "Vulnerable Links and Secure Architectures in the Stabilization of Networks of Controlled Dynamical Systems," 2012 American Control Conference, Fairmont Queen Elizabeth, Montreal, Canada, Jun. 27-29, 2012, pp. 1248-1253.

S. Warnick: "Achilles Heels Characterizing Cyber Physical System Vulnerabilities," Information & Decision Algorithms Laboratories, 2017, 54 pages.

S. Warnick: "Mission Impact Situational Awareness Tool for Distributed Operations Management for Cyber-Physical-Human Critical Infrastructures," Homeland Security Cyber Security Division, IMAM Mid Term Meeting, 2016, 35 pages.

S. Warnick et al.: "Mission Impact Situational Awareness Tool for Distributed Operations Management of Cyber-Physical-Human Critical Infrastructures/CSD.10," BAA No. 14-02, Jan. 1, 2016, 42 pages.

* cited by examiner

MODELING OF ATTACKS ON CYBER-PHYSICAL SYSTEMS

CROSS-REFERENCE TO RELATED APPLICATIONS

This application is a nonprovisional of, and claims priority to, U.S. Provisional Patent Application No. 62/430,522, filed on Dec. 6, 2016, entitled "Model of Cyber Attacks Against Infrastructure Systems" and is a nonprovisional of, and claims priority to, U.S. Provisional Patent Application No. 62/451,366, filed on Jan. 27, 2017, entitled "LOCAL CONTROL AND ESTIMATION PERFORMANCE IN DYNAMICAL NETWORKS," the disclosures of which are incorporated by reference herein in their entireties.

This invention was made with government support under Grant Numbers HSHQDC-13-C-B0052 and HSHQDC-15GB00s6 awarded by the Department of Homeland Security. The government has certain rights in the invention.

The subject matter described herein was also made possible by support from the Air Force Research Laboratory under grant number AFRL FA8750-09-2-0219. The government has certain rights in the invention.

TECHNICAL FIELD

This description relates to discovery of vulnerabilities in cyber-physical systems.

BACKGROUND

Management of some cyber-physical systems involves both human-operated and computer-based systems. For example, consider a water management system configured to delivering water to a large population. In this example, a human manager is responsible for allocating financial resources to maintain and/or improve the water management system's ability to provide water to the right customers at the right time. To acquire data for making allocation decisions, such a manager relies on various automated systems such as embedded computing systems, supervisory control systems, and communication systems.

Some cyber-physical systems can be vulnerable to sabotage, human or natural. For example, software that controls the communication systems of the water management system may be hijacked by a malicious actor. Such a hijacking could prove catastrophic to the water management system and its customers by disrupting the smooth distribution of water to the intended recipients. Conventional approaches to preventing sabotage of cyber-physical systems may not be sufficient for preventing such attacks.

SUMMARY

In one general aspect, a method can include receiving, by processing circuitry of a computer, dynamical model data relating components of a state of a graph representing a cyber-physical system, each of the components of the state of the graph corresponding to a respective node of a plurality of nodes. The method can also include generating, by the processing circuitry, a respective value of a vulnerability metric for each of a set of links between a respective set of source nodes of the plurality of nodes and a respective set of target nodes of the plurality of nodes, the vulnerability metric being based on the dynamical model data, the vulnerability metric for a link between a source node and a target node representing one of (i) a size of a change in the component of the state of the graph corresponding to the source node needed to effect a change of the component of the state of the graph corresponding to the target node, (ii) an error in a measurement of the component of the state of the graph corresponding to the target node to deduce the component of the state of the graph corresponding to the source node, and (iii) a size of a change in the component of the state of the graph corresponding to the source node needed to destabilize the cyber-physical system. The method can further include identifying, by the processing circuitry, a link between the set of source nodes and the set of target nodes of a plurality of nodes of the graph for which the vulnerability metric is greater than a specified threshold.

The details of one or more implementations are set forth in the accompanying drawings and the description below. Other features will be apparent from the description and drawings, and from the claims.

DETAILED DESCRIPTION

The conventional approaches to preventing sabotage of cyber-physical systems can include identifying vulnerabilities after the design of the system. Moreover, such an approach to identifying vulnerabilities can be limited to the domain of the human expert. For example, many human experts focus on how the software used by cyber-physical systems might be hacked. Nevertheless, focusing on software or computer hacking only addresses vulnerability at a single point and ignores the effect of such a hacking downstream to the system.

Complicating matters is that different components of cyber-physical systems may be controlled by different human entities. In such a case, communication of vulnerabilities throughout the infrastructure may be difficult enough to present as another vulnerability itself. For example, the water management system described above may be operated with cooperation among water cooperatives, canal companies, federal agencies such as the Bureau of Reclamation, Department of the Interior, and individual customers such as farmers. Furthermore, the various electronic sensors and computer systems used by the water management system may be provided by different vendors, each of whom do not communicate with the others. Accordingly, the conventional approaches to preventing sabotage attacks in cyber-physical systems result in an incomplete picture of vulnerabilities in cyber-physical systems such as a water management system because of a lack of coordination among the different human contributors to the system.

In accordance with the implementations described herein and in contrast to at least some of the conventional approaches to preventing attacks in cyber-physical systems, improved techniques of preventing attacks in cyber-physical systems can include automatically identifying links between nodes of a graph representing cyber-physical systems as vulnerable to attacks according to a vulnerability metric for each link or node. The vulnerability metric used can depend on the particular attack used to determine the vulnerable links or nodes. Once a computer configured to design cyber-physical systems based on vulnerability to attacks receives data representing the graph, the computer enumerates the possible links between nodes of the graph along which or nodes at which a sabotage attack may be performed. For each of those links or nodes, the computer computes the vulnerability metric. The computer then ranks the links or nodes according to respective values of the vulnerability metric. Based on the ranking, an analyst may then perform a mitigation analysis that results in changes to the graph to reduce the vulnerability at each link or node accessible to a malicious actor.

In one example, the attack is a destabilization attack in which a malicious actor causes catastrophic failure in the cyber-physical systems. In this case, the vulnerability metric takes the form of minimum perturbations of a state at exposed node pairs that result in such a catastrophic failure. By the Small Gain Theorem, such a minimum perturbation is inversely proportional to a norm of a matrix representing a causal relation representing causal dynamics in feedback with the chosen link.

In another example, the attack is a state hijacking attack in which a malicious actor changes the state of the graph at an accessible source node in order to induce a change in state of the graph at a target node. This is also known as a target reachability of a graph. In this case, the vulnerability metric takes the form of a minimum energy required at the source node to induce a specified change in the state of the graph at the target node. In some implementations, the energy is replaced by another positive-definite metric such as an infinity- or 1-norm.

In a further example, when the attack is a state inference attack in which a malicious actor is able to deduce the state of the graph at a source node of the graph from noisy observations of the state at a target node. This is also known as a source observability of a graph. In this case, the vulnerability metric takes the form of minimum achievable mean-square error of the state of the graph at the source node. In some implementations, the mean-square is replaced by another metric such as an infinity- or 1-norm.

In some implementations, i.e., for the computational structure graph of a state space system, the state of a graph refers to a value of a respective, measurable quantity at each of the nodes of the graph at a given time. For example, when a graph represents a water management system with a flow monitor at a node, then the state of the graph at that node at a time may be a flow rate at that time.

Figure 1:
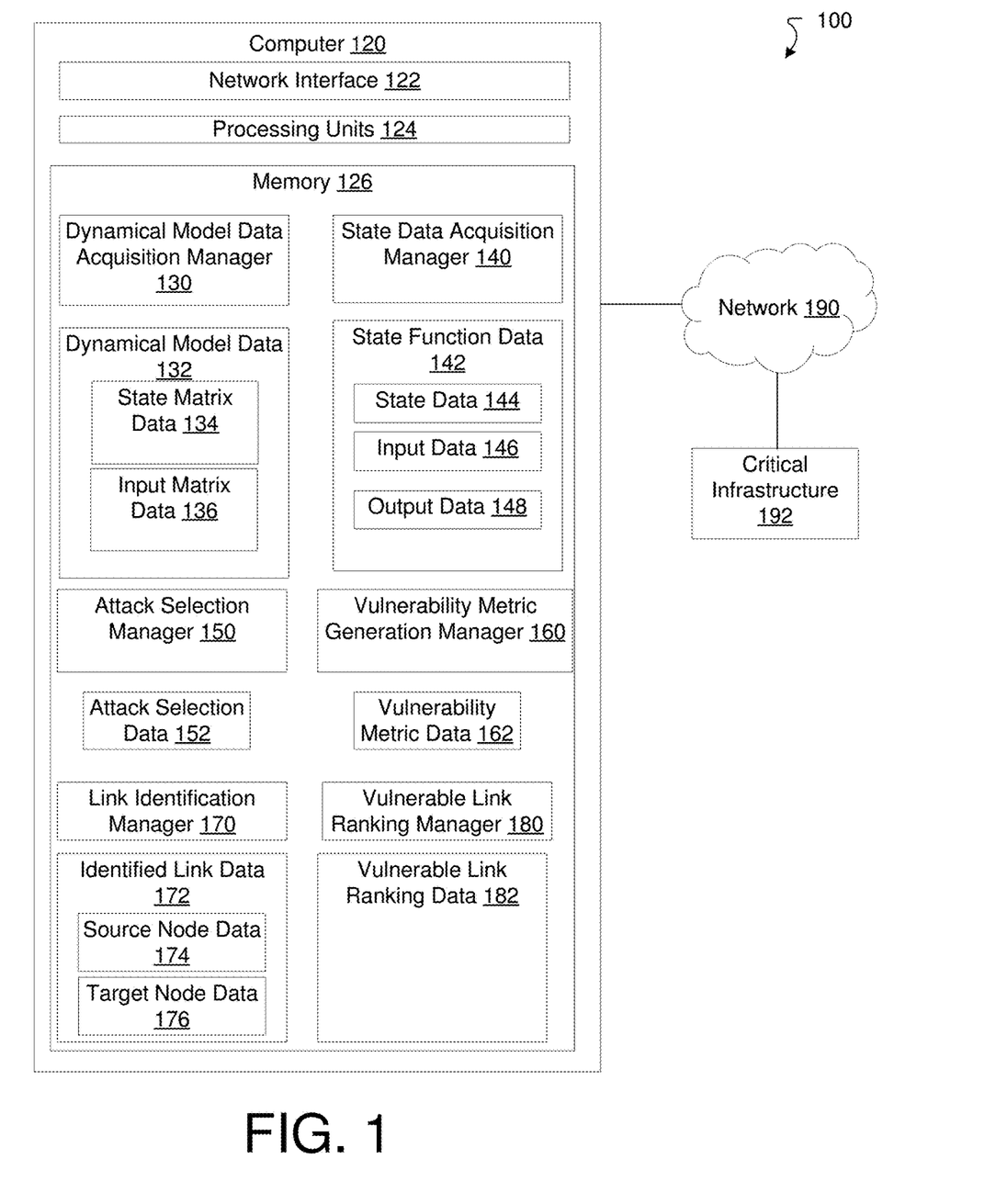
FIG. 1 is a diagram that illustrates an example electronic environment in which improved techniques described herein may be implemented.

FIG. 1 is a diagram that illustrates an example electronic environment 100 (e.g., device or set of devices) in which the above-described improved techniques may be implemented. As shown, in FIG. 1, the electronic environment 100 includes a computer 120, an electronic network 190, and a cyber-physical system 192.

The computer 120 is configured to analyze cyber-physical systems based on vulnerability to attacks. The computer 120 includes a network interface 122, one or more processing units 124, memory 126, and a display interface 128. The set of processing units 124 and the memory 126 together form control circuitry, which is configured and arranged to perform various methods and functions as described herein.

In some embodiments, one or more of the components of the computer 120 can be, or can include processors (e.g., processing units 124) configured to process instructions stored in the memory 126. Examples of such instructions as depicted in FIG. 1 include a dynamical model data acquisition manager 130, a state data acquisition manager 140, an attack selection manager 150, a vulnerability metric generation manager 160, a link identification manager 170, and a vulnerable link ranking manager 180. Further, as illustrated in FIG. 1, the memory 126 is configured to store various data, which is described with respect to the respective managers that use such data.

The dynamical model data acquisition manager 130 is configured to receive dynamical model data 132 from the cyber-physical systems 192 over the network 190. Along these lines, when the cyber-physical systems 192 is modeled as a graph with nodes and links between various pairs of nodes, then the dynamical model data 132 represents relations between the pairs of nodes that define the links. In some implementations, the dynamical model data is time-dependent and accordingly, the dynamical model data acquisition manager 130 is configured to receive the dynamical model data 132 at various times. In some implementations, the model data 132 is received in a secure environment that has no network, e.g., an air-gap system.

The dynamical model data 132 includes state matrix data 134 that represents a relation between the state of the graph at a current time and the state of the graph at a previous time. In some implementations, the state matrix data 134 represents a relation between a rate of change of the state of the graph at an instant of time and the state of the graph at the instant of time. For example, in a water management system, the state matrix data 132 may represent a change in the flow rate of water incoming into one node at a current time due to a flow rate of water outgoing from another node at a previous time.

In some implementations, the dynamical model data 132 also includes input matrix data 136 that represents a relation between external inputs applied to various nodes of the graph at a previous time and the state of the graph at a current time. For example, an external input to a node may take the form of a voltage or current signal at an instant of time used to drive a controller at a particular node or nodes.

The state data acquisition manager 140 is configured to obtain state function data 142 at various instants of time. In some implementations, the state function data 142 represents physical quantities, e.g., water flow rates, that may be measured at each of the nodes of the graph, i.e., at particular locations within the cyber-physical systems. In some implementations, the state function data 142 represents human factors, e.g., whether an official will travel from one node to another node to change a value of a variable of the other node. The state function data 142 includes state data 144 and output data 148. In some implementations, the state function data 142 also includes input data 146. In some implementations, when the state function represented by the state function data 142 is linear, time invariant, and discrete, the dynamical model data 132 provides a way to predict, or estimate, the state data 144 and output data 148 as follows:

$$x[k]=Ax[k-1]+Bu[k-1], \qquad (1)$$

$$y[k]=Cx[k]+Du[k]. \qquad (2)$$

where $x \in \mathbb{R}^n$ is the state of a graph having n nodes at each node represented by the state data 144, $y \in \mathbb{R}^n$ is the measurable output of the graph at each node represented by the output data 148, $u \in \mathbb{R}^m$ is the input at some of the nodes represented by the input data 146, k represents the $k^{th}$ instant of time, $A \in \mathbb{R}^{n \times n}$ and $C \in \mathbb{R}^{n \times n}$ are represented by the state matrix data 134, and $B \in \mathbb{R}^{n \times m}$ and $D \in \mathbb{R}^{n \times m}$ are represented by the input matrix data 136. In some implementations, the state function is nonlinear and/or time-varying.

Alternatively, in some implementations, the dynamical model data 132 provides a way to predict the state data 144 and output data 148 as follows:

$$\frac{dx}{dt} = Ax + Bu, \quad (3)$$

$$y = Cx + Du. \quad (4)$$

The attack selection manager 150 is configured to receive input from a user regarding an attack around which the user wants to analyze the cyber-physical systems 192. The attack selection manager 150 is also configured to indicate an attack model based on the selected attack in the attack selection data 152 using, e.g., a numerical indicator.

The vulnerability metric generation manager 160 is configured to generate the vulnerability metric data 162 representing values of a vulnerability metric according to the attack selection data 152. The vulnerability metric indicates how vulnerable a pair of node sets—a set of source nodes and a set of target nodes—are to any of the various attacks that may be selected by the user. The vulnerability metric may be measured in terms of, for example, the energy applied to inputs at a source node in order to change the state at a target node.

The link identification manager 170 is configured to generate identified link data 172 that identifies each of the possible links between source nodes and target nodes in a graph. For example, a link between a source node and a target node may be a pipe connecting a water ingress point and a water egress point. Accordingly, the vulnerability metric data 162 represents values of the vulnerability metric at each of the nodes of the identified links. The identified link data 172 includes source node data 174 representing the source nodes of the identified links and target node data 176 representing the target nodes of the identified links.

Links may also represent mappings between a set of source nodes and a set of target nodes. Such a generalized link is relevant in modeling coordinated attacks on a cyber-physical system.

The identified link data 172 may depend on the attack selection data 152. For example, when the selected attack is a destabilization attack, only those nodes indicated as exposed nodes, i.e., accessible to a malicious actor, are included in the identified link data 172. In this case, the exposed nodes form a subset of the nodes of the graph and are specified by the user.

In some implementations, the source nodes represented by the source node data 174 and the target nodes represented by the target node data 176 form disjoint sets. That is, there are no source nodes represented by the target node data 176 and vice-versa. The reason for this is that, if there were a node common to both the source nodes and the target nodes, then there would be no effort to control or observe the state at that node, and the vulnerability metric at this ostensible source/target node "pair" would be meaningless.

In some implementations, the vulnerable link ranking manager 180 is configured to generate vulnerable link ranking data 182. The vulnerable link ranking data 182 is an arrangement of the links represented by the identified link data 172 according to values of the vulnerability metric represented by the vulnerability metric data 162. In some implementations, the vulnerable link ranking data 182 identifies those links for which the respective values of the vulnerability metric are greater than a specified threshold. Using the vulnerable link ranking data 182, a user may perform a mitigation analysis on the most vulnerable links.

In some implementations, the vulnerable link ranking data 182 may represent a ranking of vulnerable nodes in, for example, state inference attacks. The vulnerable link ranking data 182 is an arrangement of the nodes represented by the identified link data 172 according to values of the vulnerability metric represented by the vulnerability metric data 162. In some implementations, the vulnerable link ranking data 182 identifies those modes for which the respective values of the vulnerability metric are greater than a specified threshold. Using the vulnerable link ranking data 182, a user may perform a mitigation analysis on the most vulnerable nodes.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

In some embodiments, one or more of the components of the computer 120 can be, or can include, processors configured to process instructions stored in a memory. For example, a dynamical model acquisition manager 130 (and/or a portion thereof), a state data acquisition manager 140 (and/or a portion thereof), an attack selection manager 150 (and/or a portion thereof), a vulnerability metric generation manager 160 (and/or a portion thereof), a link identification manager 170 (and/or a portion thereof), and a vulnerable link ranking manager 180 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the editing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the editing computer 120. As illustrated in FIG. 1, the memory 126 is configured to store various data, including dynamical model data 132, state function data 142, and vulnerability metric data 154.

In some implementations, the network interface 122 includes, for example, Ethernet adaptors, Token Ring adaptors, and the like, for converting electronic and/or optical signals received from a network to electronic form for use by the editing computer 120. The set of processing units 124 include one or more processing chips and/or assemblies. The memory 126 includes both volatile memory (e.g., RAM) and non-volatile memory, such as one or more ROMs, disk drives, solid state drives, and the like.

The network 190 is configured and arranged to provide network connections between the computer 120 and the cyber-physical systems. The network 190 may implement any of a variety of protocols and topologies that are in common use for communication over the Internet or other networks. Further, the network 190 may include various components (e.g., cables, switches/routers, gateways/bridges, etc.) that are used in such communications.

Figure 2:
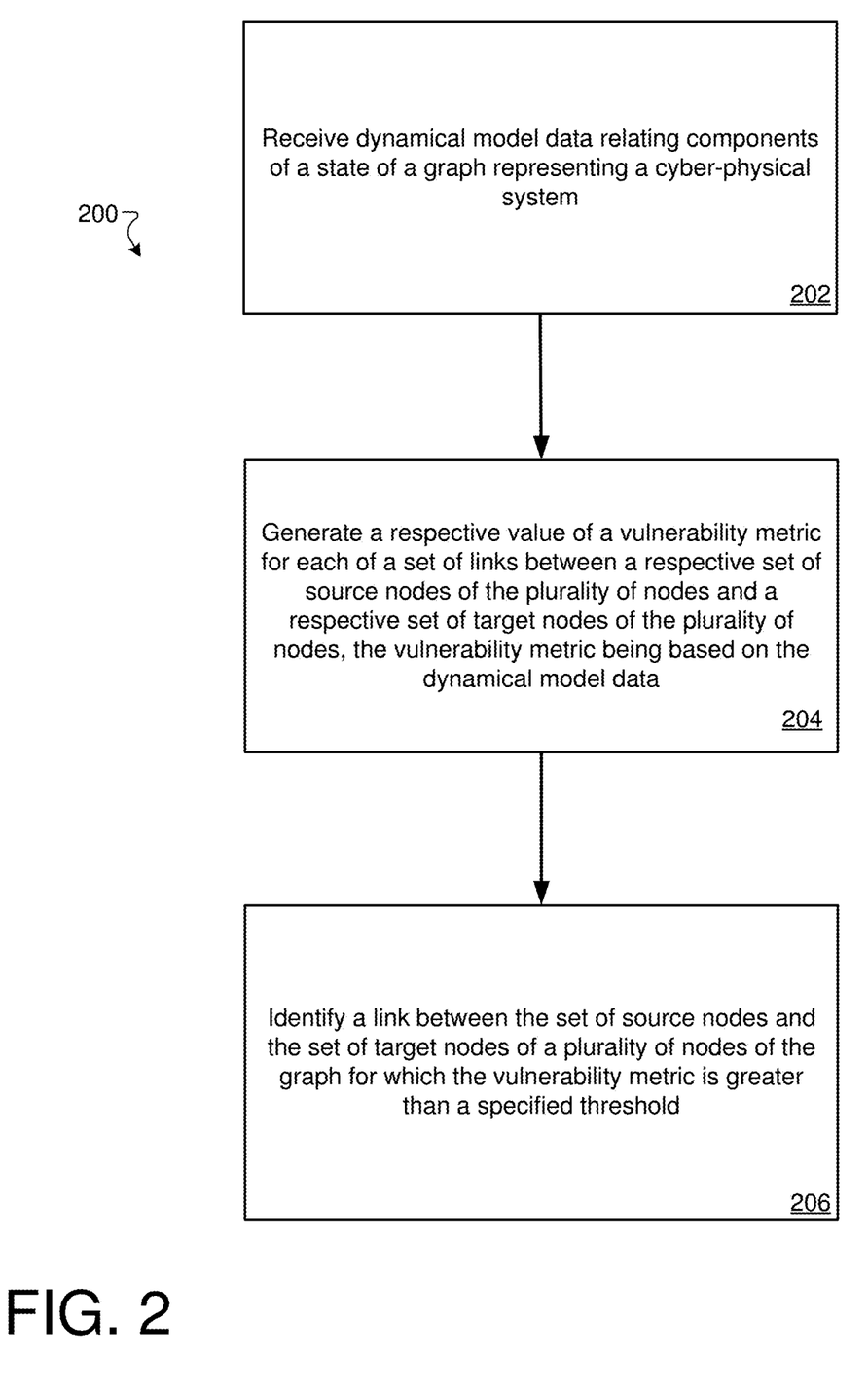
FIG. 2 is a flow chart that illustrates an example method of implementing the improved techniques as shown in the electronic environment in FIG. 1.

FIG. 2 is a flow chart depicting an example method 200 of displaying user-specified drawings on a display device. The method 200 may be performed by software constructs described in connection with FIG. 1, which reside in memory 126 of the computer 120 and are run by the set of processing units 124.

At 202, the dynamical model acquisition manager 130 receives dynamical model data 132 relating components of a state of a graph representing a cyber-physical system, each of the components of the state of the graph corresponding to a respective node of a plurality of nodes.

At 204, the vulnerability metric generation manager 160 generates a respective value of a vulnerability metric for each of a set of links between a respective set of source nodes of the plurality of nodes and a respective set of target nodes of the plurality of nodes. The vulnerability metric is based on the dynamical model data 132. Each of the plurality of nodes of the graph the vulnerability metric for a link between a source node and a target node represents one of (i) a size of a change in the component of the state of the graph corresponding to the source node needed to effect a change of the component of the state of the graph corresponding to the target node, (ii) an error in a measurement of the component of the state of the graph corresponding to the target node to deduce the component of the state of the graph corresponding to the source node, and (iii) a size of a change in the component of the state of the graph corresponding to the source node needed to destabilize the cyber-physical system.

At 206, the vulnerable link ranking manager 180 identifies a link between a set of source nodes and a set of target nodes of a plurality of nodes of the graph for which the vulnerability metric is greater than a specified threshold.

Figure 3:
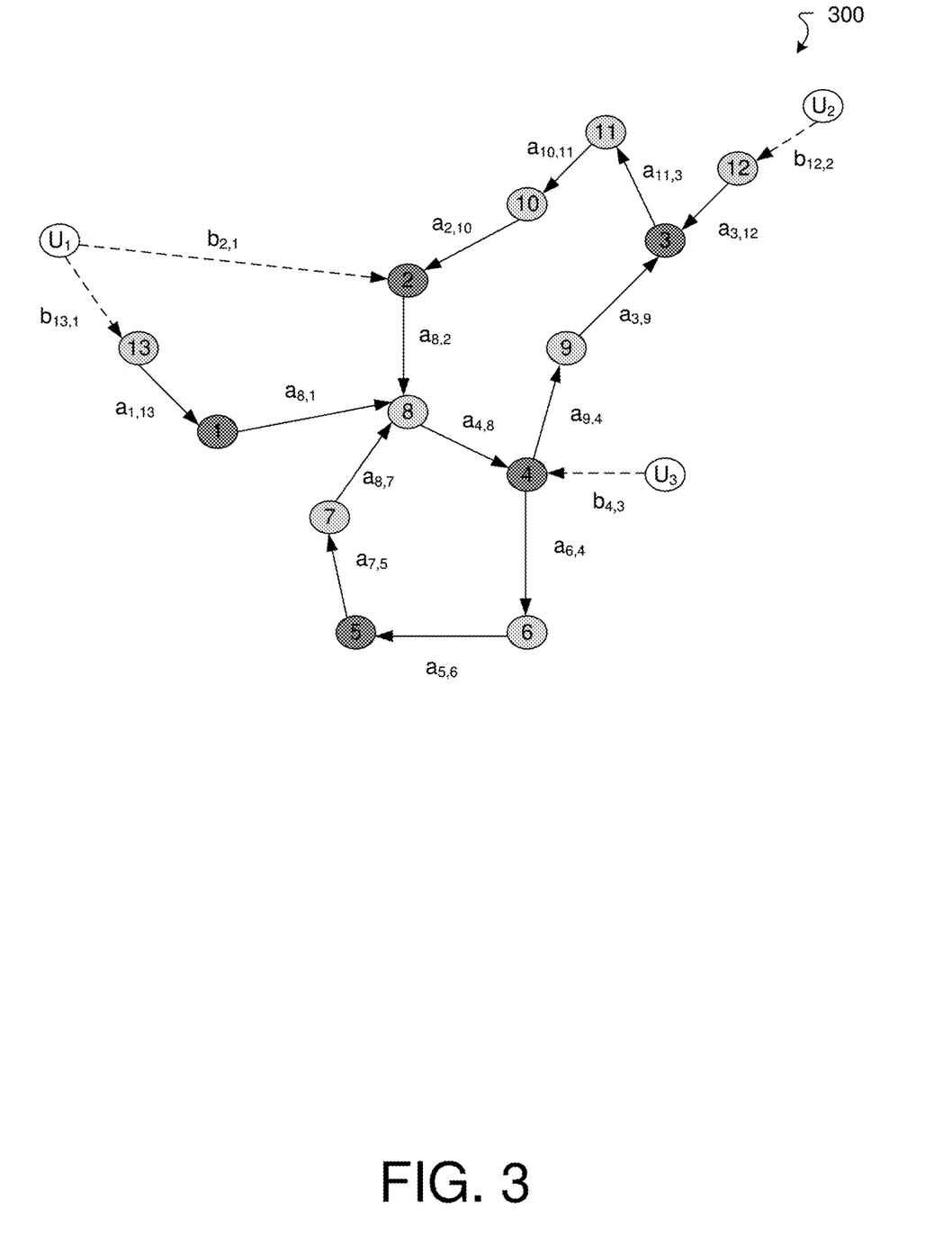
FIG. 3 is a diagram illustrating an example graph model of cyber-physical systems according to the improved techniques as shown in the electronic environment in FIG. 1.

FIG. 3 is a diagram illustrating an example graph 300 of cyber-physical systems 192. The graph 300 has 13 state nodes at which the state may be controlled or measured and 3 input nodes $U_1$, $U_2$, and $U_3$. The dashed arrows indicate an input from an input node to a state node. The solid arrows indicate a link between a source or input node and a target node of the state nodes.

The strength of a link from source node i to target node j is denoted by $a_{j,i}$, while the strength of a link from input k to node j is denoted by $b_{j,k}$. Accordingly, the state matrix data 134 represents the following 13×13 matrix in this case:

$$A = \begin{pmatrix} a_{1,1} & 0 & 0 & 0 & 0 & 0 & 0 & 0 & 0 & 0 & 0 & 0 & a_{1,13} \\ 0 & a_{2,2} & 0 & 0 & 0 & 0 & 0 & 0 & 0 & a_{2,10} & 0 & 0 & 0 \\ 0 & 0 & a_{3,3} & 0 & 0 & 0 & 0 & 0 & a_{3,9} & 0 & 0 & a_{3,12} & 0 \\ 0 & 0 & 0 & a_{4,4} & 0 & 0 & 0 & a_{4,8} & 0 & 0 & 0 & 0 & 0 \\ 0 & 0 & 0 & 0 & a_{5,5} & a_{5,6} & 0 & 0 & 0 & 0 & 0 & 0 & 0 \\ 0 & 0 & 0 & a_{6,4} & 0 & a_{6,6} & 0 & 0 & 0 & 0 & 0 & 0 & 0 \\ 0 & 0 & 0 & 0 & a_{7,5} & 0 & a_{7,7} & 0 & 0 & 0 & 0 & 0 & 0 \\ a_{8,1} & a_{8,2} & 0 & 0 & 0 & 0 & 0 & a_{8,8} & 0 & 0 & 0 & 0 & 0 \\ 0 & 0 & 0 & a_{9,4} & 0 & 0 & 0 & 0 & a_{9,9} & 0 & 0 & 0 & 0 \\ 0 & 0 & 0 & 0 & 0 & 0 & 0 & 0 & 0 & a_{10,10} & a_{10,11} & 0 & 0 \\ 0 & 0 & a_{11,3} & 0 & 0 & 0 & 0 & 0 & 0 & a_{11,11} & 0 & 0 & 0 \\ 0 & 0 & 0 & 0 & 0 & 0 & 0 & 0 & 0 & 0 & 0 & a_{12,12} & 0 \\ 0 & 0 & 0 & 0 & 0 & 0 & 0 & 0 & 0 & 0 & 0 & 0 & a_{13,13} \end{pmatrix}. \quad (5)$$

Further, the input matrix data 136 represents the following 13×3 matrix:

$$B = \begin{pmatrix} 0 & 0 & 0 \\ b_{2,1} & 0 & 0 \\ 0 & 0 & 0 \\ 0 & 0 & b_{4,3} \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & b_{12,2} & 0 \\ b_{13,1} & 0 & 0 \end{pmatrix}. \quad (6)$$

In some implementations, all of the state nodes can be measured. Accordingly, in this case, C=1 and D=0.

In the graph 300, the nodes 1-5 are shown in a darker shade of gray than the nodes 6-13. The nodes 1-5 are distinguished here as being exposed, or having exposed states, while the nodes 6-13 have hidden states. A state is exposed at a node when the state at that node may be perturbed or measured by some malicious actor. A state is hidden at a node when the state at that node is inaccessible to anyone not authorized to access the node.

Figure 4:
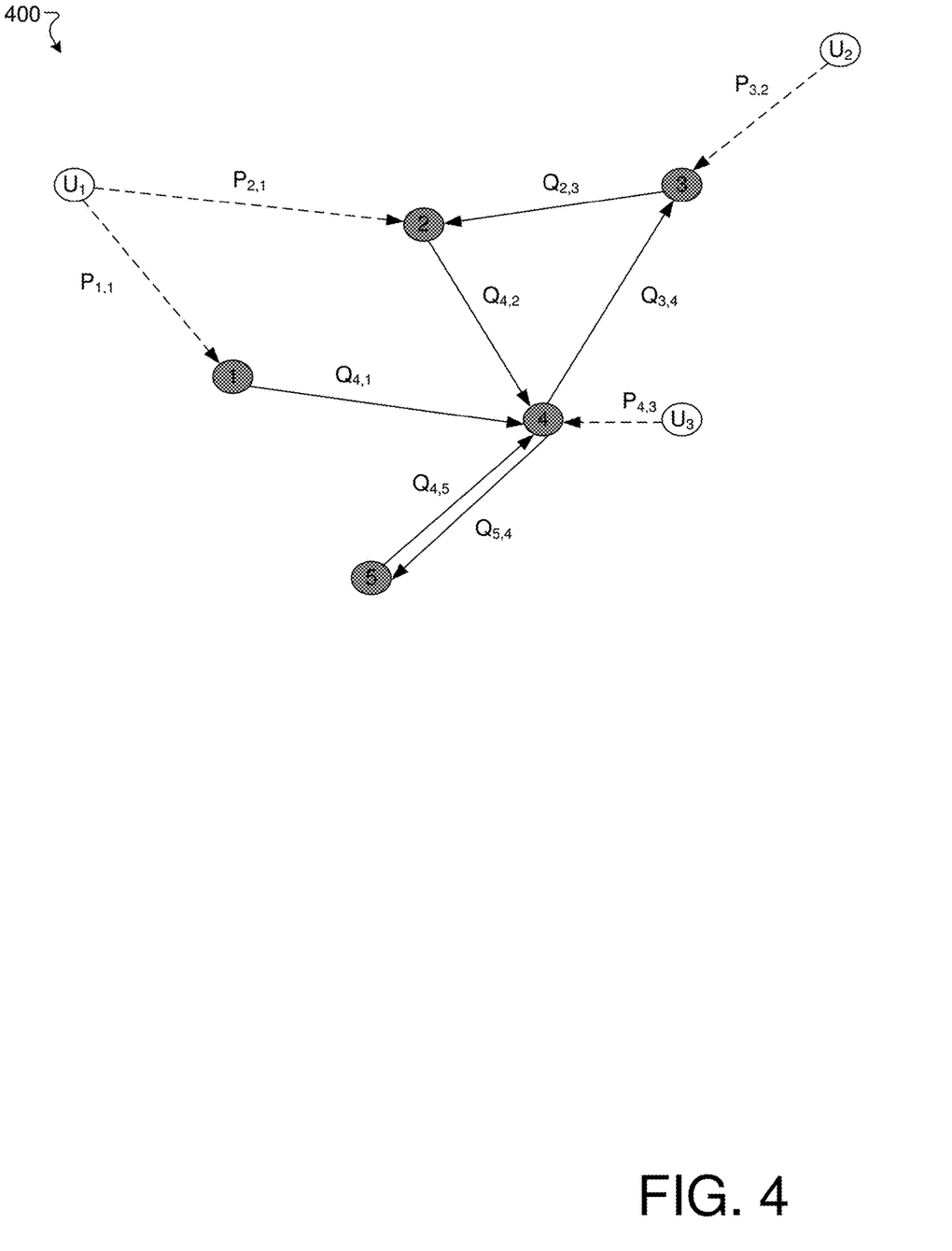
FIG. 4 is a diagram illustrating an example graph model of exposed nodes of cyber-physical systems according to the improved techniques as shown in the electronic environment in FIG. 1.

In some implementations, the analysis of an attack involves a discernment as to whether a state is exposed or hidden at any particular node. The generation of an attack surface that simplifies the graph in response to such a discernment is described with respect to FIG. 4. FIG. 4 is a diagram illustrating an example graph 400 of exposed nodes of cyber-physical systems. The link strengths $Q_{j,i}$ from source node i to target node j (defining the matrix Q) and the link strengths $P_{j,k}$ from input k to node j (defining the matrix P) may be determined explicitly in terms of the state matrix A and input matrix B as follows when the dynamical system is linear time-invariant.

Suppose that, out of n nodes in a graph, there are l exposed nodes. Eq. (3) may be rewritten in the following form:

$$\begin{pmatrix} \dot{y} \\ \dot{x}_h \end{pmatrix} = \begin{pmatrix} A_{11} & A_{12} \\ A_{21} & A_{22} \end{pmatrix} \begin{pmatrix} y \\ x_h \end{pmatrix} + \begin{pmatrix} B_1 \\ B_2 \end{pmatrix} u, \quad (7)$$

where the top row corresponds to the l exposed states and the bottom row corresponds to the n hidden states, and the dot represents a time derivative. This differential equation may be converted into an algebraic equation by applying a Laplace transform to both sides of Eq. (7). When the initial states are assumed to be zero and the exposed and hidden states are treated separately, the algebraic equations take the form $$sY(s) = A_{11}Y(s) + A_{12}X_h(s) + B_1U(s), \quad (8)$$

$$sX_h(s) = A_{21}X_h(s) + A_{22}Y(s) + B_2U(s), \quad (9)$$

where s is the Laplace transform variable and Y, $X_h$, and U are Laplace transforms of y, $x_h$, and u, respectively.

The hidden states may be eliminated to leave an implicit expression known as an attack surface model for the exposed states as follows:

$$Y(s) = Q(s)Y(s) + P(s)U(s), \quad (10)$$

where $$Q(s) = (s - \text{Diag}[W(s)])^{-1}(W(s) - \text{Diag}[W(s)]), \quad (11)$$

$$P(s) = (s - \text{Diag}[W(s)])^{-1}V(s), \quad (12)$$

$$W(s) = A_{11} + A_{12}(s - A_{22})^{-1}A_{21}, \quad (13)$$

$$V(s) = B_1 + A_{12}(s - A_{22})^{-1}B_2, \quad (14)$$

and Diag[W] indicates the diagonal of the matrix W.

Eqs. (10)-(14) define the link strengths illustrated in the graph 400 explicitly in terms of the links strengths illustrated in the graph 300 in FIG. 3. In turn, Eq. (10) is an implicit equation for the exposed states Y(s) that, when made explicit, generates the transfer function G(s) for the system represented by the graph 400:

$$G(s) = (1 - Q(s))^{-1}P(s), \quad (15)$$

i.e., Y(s)=G(s)U(s). The transfer function G(s) explicitly relates inputs U(s) to measurable output states Y(s).

Figure 5:
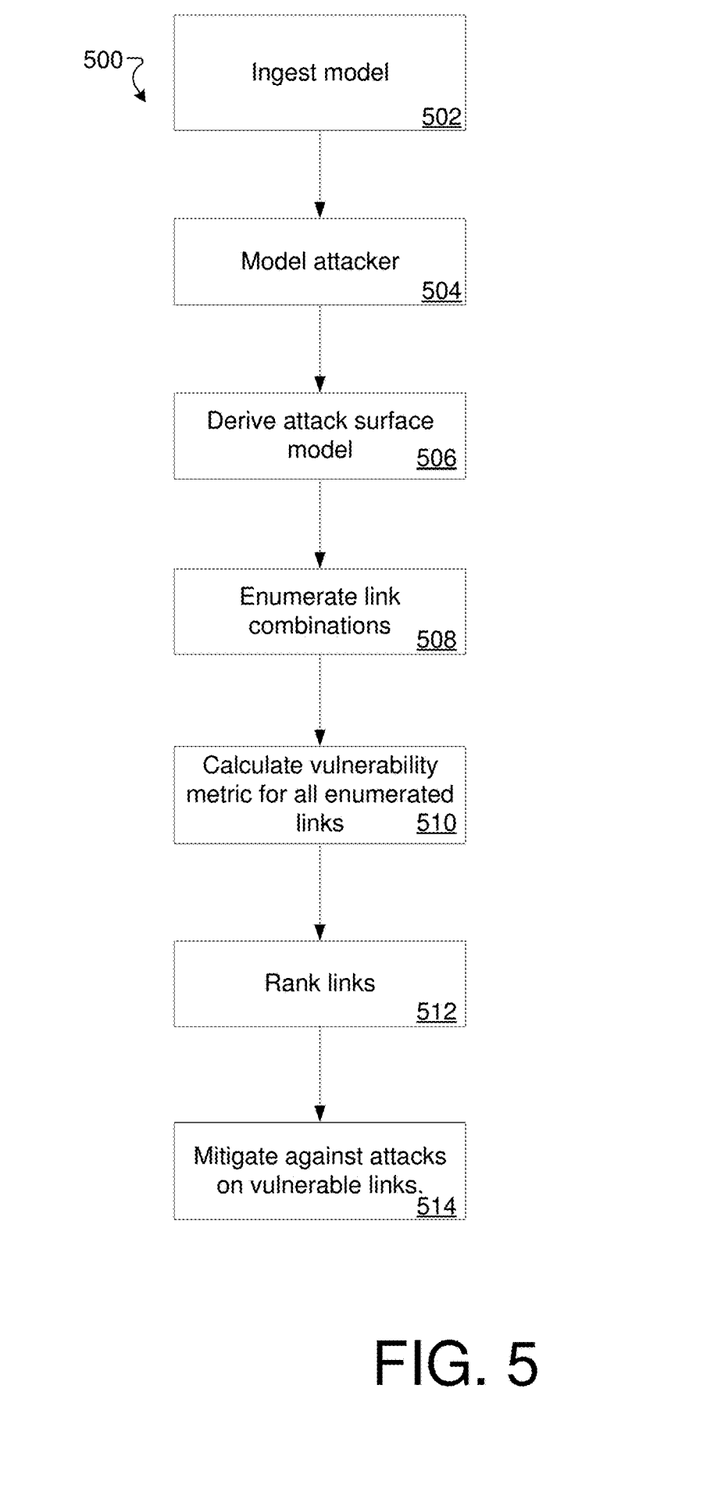
FIG. 5 is a flow chart that illustrates an example process of designing destabilization attacks in cyber-physical systems according to the improved techniques shown in the electronic environment in FIG. 1.

FIG. 5 is a flow chart illustrating an example process 500 for analyzing cyber-physical systems to mitigate against attacks. The process 500 may be performed by software constructs described in connection with FIG. 1, which reside in memory 126 of the computer 120 and are run by the set of processing units 124.

Destabilization Attack

Eq. (15) defines the condition under which the system represented by the graph 400 may be destabilized. Let M denote the $ji^{th}$ entry of the matrix $(1-Q)^{-1}$, corresponding to the link from node i to node j. Suppose that at the node i there is a multiplicative perturbation Δ to the state Y(s). By the small gain theorem, the minimum such perturbation Δ that would result in a destabilization of the system, i.e., that would force the factor $(1-Q)^{-1}$ to have a sufficiently large norm (e.g., induced norm), is $$\|\Delta\| = \frac{1}{\|M\|}, \quad (16)$$

where the norm is an induced norm, or any other norm that may be appropriate. Eq. (16) specifies the minimum norm of a perturbation to a state at a source node that would destabilize the system. Eq. (16) specifies the norm of such a perturbation. Accordingly, there may be many such perturbations that may have this minimum norm.

At 502, the dynamical model data acquisition manager 130 receives state matrix data 134 and input matrix data 136 representing, respectively, the matrices A and B.

At 504, the user models the attacker by identifying the exposed nodes. The user may also decide whether an attacker is constrained to work over existing links or may create new ones. The user may further decide whether the attacker may attack using only a single link or over multiple links at once.

At 506, the dynamical model data acquisition manager 130 derives the attack surface model by generating new state matrix data 134 representing the matrix Q and new input matrix data 136 representing the matrix P according to Eqs. (11)-(14).

At 508, the link identification manager 170 enumerates link combinations by generating the identified link data 172 based on the above selections and identification of exposed nodes.

At 510, the vulnerability metric generation manager 160 computes, as the vulnerability metric for all enumerated links, the quantity $$\frac{1}{\|M\|}$$

for each such link.

At 512, the vulnerable link ranking manager 180 ranks the links from highest to lowest value of the vulnerability metric. In some implementations, the links may be ranked from lowest to highest value.

At 514, the user may use the vulnerable link ranking data 182 to select a mitigation strategy for mitigating against attacks on the most vulnerable links.

State Hijacking Attack and State Inference Attack

In a state hijacking attack, a malicious actor may desire to influence the state at a target node by controlling the state at a source node. The target control (TC) problem states that, for a given state matrix as in Eq. (1), what is the minimum energy required at the source node to make a specified change at the target node?

Without loss of generality, the TC problem may be stated as follows. Given that $x[k+1]=Ax[k]+e_s u[k]$, where $e_s$ is a 0-1 indicator vector with only the entry s corresponding to the source node being nonzero, find the minimum energy or, more generally, effort, such that $e_t^T x[\hat{k}]=1$ at some time horizon $\hat{k}$. The energy is defined in terms of the input vector as the minimum over $u[0], u[1], \ldots, u[\hat{k}-1]$ of $$E(\hat{k}) = \sum_{k=0}^{\hat{k}-1} u[k]^2. \quad (16)$$

The quantity $$E = \lim_{\hat{k} \to \infty} E(\hat{k})$$

may also be defined when ample time is available for control. In some implementations, the energy may be defined with respect to a 1-norm or an infinity-norm.

It has been shown that the energy may be expressed explicitly in terms of the state matrix A as follows:

$$E(\hat{k}) = \frac{1}{\sum_{k=0}^{\hat{k}-1} (e_t^T A^k e_s)^2}. \quad (17)$$

This leads to the following for the ample time limit:

$$E = \frac{1}{\sum_{k=0}^{\infty} (A^k)_{ts}^2}, \quad (18)$$

i.e., a sum over the square of the powers of the is element of the state matrix A. Eqs. (17) or (18) define the vulnerability metric for the state hijacking attack.

In a state inference attack, a malicious actor may desire to infer with as much accuracy as possible the initial state at a source node $e_s^T x[0]$ based on noisy measurements $y[0], y[1], \ldots, y[\hat{k}-1]$ from a target node. Given that $$x[k]=Ax[k-1], \quad (19)$$

$$y[k]=e_t^T x[k]+N[k], \quad (20)$$

where N[k] is a zero-mean, unit-variance, white Gaussian noise signal, the source estimation (SE) problem specifies the minimum achievable mean-square error ("estimation fidelity") $F(\hat{k})$ in the estimate among unbiased estimators od the source node's initial state. The quantity $$F = \lim_{\hat{k} \to \infty} F(\hat{k})$$

may also be defined when ample time is available for control.

It has been shown that the estimation fidelity may be expressed explicitly in terms of the state matrix A as follows:

$$F(\hat{k})=e_s^T G_o^{-1} e_s, \quad (21)$$

where the observability Gramian $G_o$ is given by $$G_o = \sum_{k=0}^{\hat{k}-1} (A^T)^k e_t e_t^T A^k. \quad (22)$$

The estimation fidelity is the $s^{th}$ diagonal entry of the inverse of the observability Gramian.

At 502, the dynamical model data acquisition manager 130 receives state matrix data 134 representing the matrix A.

At 504, the user models the attacker by identifying the exposed nodes. The user may also decide whether an attacker is constrained to work over existing links or may create new ones. The user may further decide whether the attacker may attack using only a single link or over multiple links at once.

In some implementations, at 506, the dynamical model data acquisition manager 130 derives the attack surface model by generating new state matrix data 134 representing the matrix Q and new input matrix data 136 representing the matrix P according to Eqs. (11)-(14).

At 508, the link identification manager 170 enumerates link combinations by generating the identified link data 172 based on the above selections and identification of exposed nodes.

At 510, the vulnerability metric generation manager 160 computes, as the vulnerability metric for all enumerated links, the quantity E or F according to whether the attack is a state hijacking attack or a state inference attack.

At 512, the vulnerable link ranking manager 180 ranks the links from highest to lowest value of the vulnerability metric.

At 514, the user may use the vulnerable link ranking data 182 to select a mitigation strategy for mitigating against attacks on the most vulnerable links.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   receiving, by processing circuitry of a computer, dynamical model data relating components of a state of a graph representing a cyber-physical system, each of the components of the state of the graph corresponding to a respective node of a plurality of nodes;
   generating, by the processing circuitry, a respective value of a vulnerability metric for each of a set of links between a respective set of source nodes of the plurality of nodes and a respective set of target nodes of the plurality of nodes, the vulnerability metric being based on the dynamical model data, the vulnerability metric for a link between a source node and a target node representing one of (i) a size of a change in the component of the state of the graph corresponding to the source node needed to effect a change of the component of the state of the graph corresponding to the target node, (ii) an error in a measurement of the component of the state of the graph corresponding to the target node to deduce the component of the state of the graph corresponding to the source node, or (iii) a size of a change in the component of the state of the graph corresponding to the source node needed to destabilize the cyber-physical system; and
   identifying, by the processing circuitry, a link between a set of source nodes and a set of target nodes of a plurality of nodes of the graph for which the vulnerability metric is greater than a specified threshold.

2. The method as in claim 1, wherein the dynamical model data includes a state matrix, the state matrix being a multiplier to the state of the graph, the input matrix being a multiplier to a set of inputs at a subset of the plurality of nodes of the graph.

3. The method as in claim 2,
   wherein the dynamical model data further represents an input matrix, the input matrix relating a set of inputs applied to a corresponding set of nodes of the plurality of nodes of the graph, and
   wherein the generating the respective value of the vulnerability metric for each of a set of links between the respective set of source nodes of the plurality of nodes and the respective set of target nodes of the plurality of nodes includes:
      receiving a set of identifiers identifying a corresponding set of nodes as a set of exposed nodes of the plurality of nodes;
      generating a transfer function matrix that relates the set of inputs to the components of the state of the graph corresponding to each of the set of exposed nodes, the transfer function matrix being based on the state matrix and the input matrix;
      producing an element of the transfer function matrix corresponding to a set of source nodes and a set of target nodes of the set of exposed nodes; and
      generating, as the value of the vulnerability metric, a reciprocal of a norm of the element of the transfer function matrix.

4. The method as in claim 3, wherein the identifying the link between the set of source nodes and the set of target nodes of the plurality of nodes of the graph includes:
   performing a ranking operation on the each of the set of links according to the vulnerability metric for that link.

5. The method as in claim 2,
   wherein the value of the vulnerability metric is a minimum energy needed to change the component of the state of the graph corresponding to the target node to a target value, the minimum energy being based on the state matrix.

6. The method as in claim 5, wherein the generating the respective value of the vulnerability metric for each of a set of links between the respective set of source nodes of the plurality of nodes and the respective set of target nodes of the plurality of nodes includes:
   generating a sum over squares of the element corresponding to a source node of the set of source nodes and a target node of the set of target nodes of powers of the state matrix; and
   producing, as the value of the minimum energy needed to change the state of the graph at the target node to the target value, a reciprocal of the sum.

7. The method as in claim 6, wherein the identifying the link between the set of source nodes and the set of target nodes of the plurality of nodes of the graph for which the vulnerability metric is greater than the specified threshold includes:
   for the target node, generating the minimum energy required to change the state of the graph at the target node to the target value at each node from which the target node is reachable; and
   generating a ranking of the minimum energy over each node from which the target node is reachable.

8. The method as in claim 2,
   wherein the value of the vulnerability metric is a minimum unbiased-estimator error that is based on the state matrix.

9. The method as in claim 8, wherein the generating the respective value of the vulnerability metric for each of a set of links between a respective source node of the plurality of nodes and a respective target node of the plurality of nodes includes:

generating a diagonal element of an inverse of an observability Gramian corresponding to the source node, the observability Gramian being a sum over the diagonal elements corresponding to a target node of the set of target nodes of the square powers of the state matrix; and producing, as the value of the minimum unbiased-estimator error, a reciprocal of the sum.

10. The method as in claim 9, wherein the identifying the link between the set of source nodes and the set of target nodes of the plurality of nodes of the graph that are vulnerable to the sabotage attack according to the vulnerability metric includes:

generating a respective filter used to convert a set of measurements at each node from which the target node is reachable to an estimate of the state of the graph at the target node; and performing a ranking over the minimum unbiased estimator error at the target node from the set of measurements at each node from which the target node is reachable.

11. A computer program product comprising a nontransitory storage medium, the computer program product including code that, when executed by processing circuitry of a computer, causes the processing circuitry to perform a method, the method comprising:

receiving dynamical model data relating components of a state of a graph representing a cyber-physical system, each of the components of the state of the graph corresponding to a respective node of a plurality of nodescyber-physical systems;

generating a respective value of a vulnerability metric for each of a set of links between a respective set of source nodes of the plurality of nodes and a respective set of target nodes of the plurality of nodes, the vulnerability metric being based on the dynamical model data, the vulnerability metric for a link between a source node and a target node representing one of (i) a size of a change in the component of the state of the graph corresponding to the source node needed to effect a change of the component of the state of the graph corresponding to the target node, (ii) an error in a measurement of the component of the state of the graph corresponding to the target node to deduce the component of the state of the graph corresponding to the source node, or (iii) a size of a change in the component of the state of the graph corresponding to the source node needed to destabilize the cyber-physical system; and identifying a link between a set of source nodes and a set of target nodes of a plurality of nodes of the graph for which the vulnerability metric is greater than a specified threshold.

12. The computer program product as in claim 11, wherein the dynamical model data includes a state matrix, the state matrix being a multiplier to the state of the graph at the previous time, the input matrix being a multiplier to a set of inputs at a subset of the plurality of nodes of the graph.

13. The computer program product as in claim 12, wherein the dynamical model data further represents an input matrix, the input matrix relating a set of inputs applied to a corresponding set of nodes of the plurality of nodes of the graph, and wherein the generating the respective value of the vulnerability metric for each of a set of links between the respective set of source nodes of the plurality of nodes and the respective set of target nodes of the plurality of nodes includes:

receiving a set of identifiers identifying a corresponding set of nodes as a set of exposed nodes of the plurality of nodes;

generating a transfer function matrix that relates the set of inputs to the components of the state of the graph corresponding to each of the set of exposed nodes, the transfer function matrix being based on the state matrix and the input matrix;

producing an element of the transfer function matrix corresponding to a set of source nodes and a set of target nodes of the set of exposed nodes; and generating, as the value of the vulnerability metric, a reciprocal of a norm of the element of the transfer function matrix.

14. The computer program product as in claim 13, wherein the identifying the link between the set of source nodes and the set of target nodes of the plurality of nodes of the graph includes:

performing a ranking operation on the each of the set of links according to the vulnerability metric for that link.

15. The computer program product as in claim 12, wherein the value of the vulnerability metric is a minimum energy needed to change the component of the state of the graph corresponding to the target node to a target value, the minimum energy being based on the state matrix.

16. The computer program product as in claim 15, wherein the generating the respective value of the vulnerability metric for each of a set of links between the respective set of source nodes of the plurality of nodes and the respective set of target nodes of the plurality of nodes includes:

generating a sum over squares of the element corresponding to a source node of the set of source nodes and a target node of the set of target nodes of powers of the state matrix; and producing, as the value of the minimum energy needed to change the state of the graph at the target node to the target value, a reciprocal of the sum.

17. The computer program product as in claim 16, wherein the identifying the link between the set of source nodes and the set of target nodes of the plurality of nodes of the graph for which the vulnerability metric is greater than the specified threshold includes:

for the target node, generating the minimum energy required to change the state of the graph at the target node to the target value at each node from which the target node is reachable; and generating a ranking of the minimum energy over each node from which the target node is reachable.

18. The computer program product as in claim 12, wherein the value of the vulnerability metric is a minimum unbiased-estimator error that is based on the state matrix.

19. The computer program product as in claim 18, wherein the generating the respective value of the vulnerability metric for each of a set of links between a respective source node of the plurality of nodes and a respective target node of the plurality of nodes includes:

generating a diagonal element of an inverse of an observability Gramian corresponding to the source node, the observability Gramian being a sum over the diagonal elements corresponding to a target node of the set of target nodes of the square powers of the state matrix; and producing, as the value of the minimum unbiased-estimator error, a reciprocal of the sum.

20. The computer program product as in claim 19, wherein the identifying the link between the set of source nodes and the set of target nodes of the plurality of nodes of the graph that are vulnerable to the sabotage attack according to the vulnerability metric includes:

generating a respective filter used to convert a set of observations at each node from which the target node is reachable to an estimate of the state of the graph at the target node; and performing a ranking over the minimum unbiased estimator error at the target node from the set of observations at each node from which the target node is reachable.

21. An electronic apparatus comprising:
a network interface;
a memory; and
controlling circuitry coupled to the memory, the controlling circuitry being configured to:
receive dynamical model data relating components of a state of a graph representing a cyber-physical system, each of the components of the state of the graph corresponding to a respective node of a plurality of nodes;

generate a respective value of a vulnerability metric for each of a set of links between a respective set of source nodes of the plurality of nodes and a respective set of target nodes of the plurality of nodes, the vulnerability metric being based on the dynamical model data, the vulnerability metric for a link between a source node and a target node representing one of (i) a size of a change in the component of the state of the graph corresponding to the source node needed to effect a change of the component of the state of the graph corresponding to the target node, (ii) an error in a measurement of the component of the state of the graph corresponding to the target node to deduce the component of the state of the graph corresponding to the source node, or (iii) a size of a change in the component of the state of the graph corresponding to the source node needed to destabilize the cyber-physical system; and identify a link between a set of source nodes and a set of target nodes of a plurality of nodes of the graph for which the vulnerability metric is greater than a specified threshold.

* * * * *